United States Patent

Sixt

[15] 3,699,684
[45] Oct. 24, 1972

[54] CORRUGATED DRAINAGE TUBES AND FITTINGS

[72] Inventor: Marty E. Sixt, Iowa City, Iowa

[73] Assignee: Advanced Drainage Systems, Inc., Waterville, Ohio

[22] Filed: June 30, 1970

[21] Appl. No.: 56,098

Related U.S. Application Data

[63] Continuation of Ser. No. 819,339, April 25, 1969, Continuation of Ser. No. 663,051, Aug. 24, 1967.

[52] U.S. Cl. ............................ 61/11, 61/13, 138/96, 138/120, 285/373, 285/420
[51] Int. Cl. ......................... E02b 13/00, F16l 11/04

[58] Field of Search ........ 61/11, 12, 10, 13; 138/121, 138/120, 96, 173; 285/420, 423, 424, 373

[56] References Cited

UNITED STATES PATENTS

| | | | |
|---|---|---|---|
| 1,055,674 | 3/1913 | Smith | 61/11 |
| 2,365,888 | 12/1944 | Linderfelt et al. | 138/96 |
| 2,787,442 | 4/1957 | Lewis | 285/419 X |
| 3,330,303 | 7/1967 | Fochler | 138/120 |
| 3,374,634 | 3/1968 | Fochler | 61/10 |
| 3,440,822 | 4/1969 | Hegler | 61/10 |
| 3,455,584 | 7/1969 | Henrickson | 285/373 |

*Primary Examiner*—Jacob Shapiro
*Attorney*—Connolly and Hutz

[57] ABSTRACT

Flexible corrugated drainage tubes having alternating annular peaks and valleys and a plurality of slotted openings arranged transversely to the the longitudinal axis of the tubes. The fittings include flexible couplings for connecting the ends of corrugated tubes together and end plugs for capping the ends of tubes.

13 Claims, 11 Drawing Figures

PATENTED OCT 24 1972 3,699,684
SHEET 1 OF 2
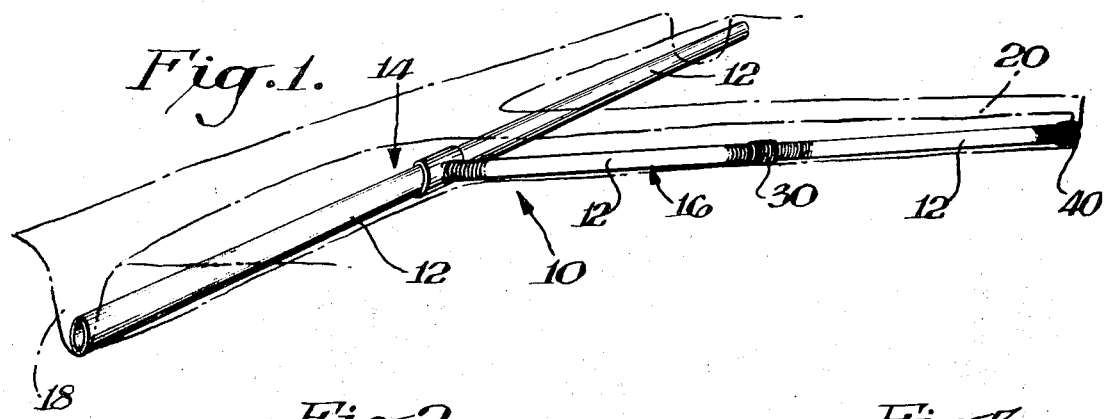
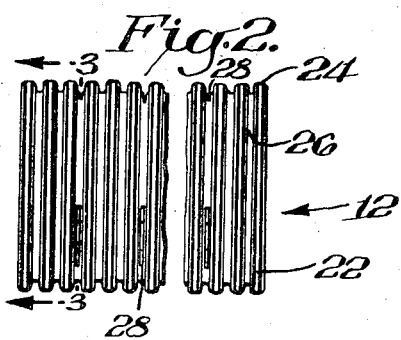
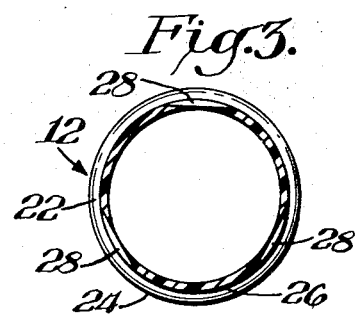
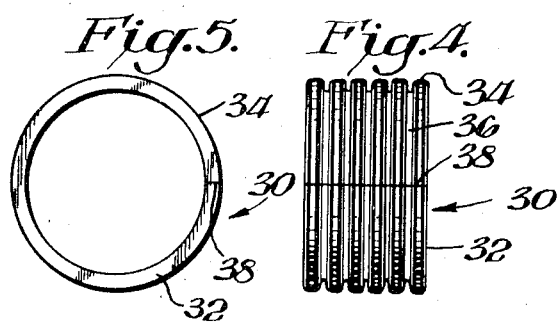
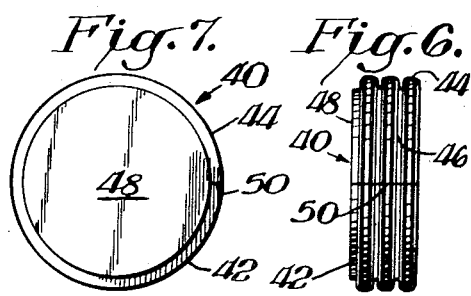

PATENTED OCT 24 1972  3,699,684
SHEET 2 OF 2
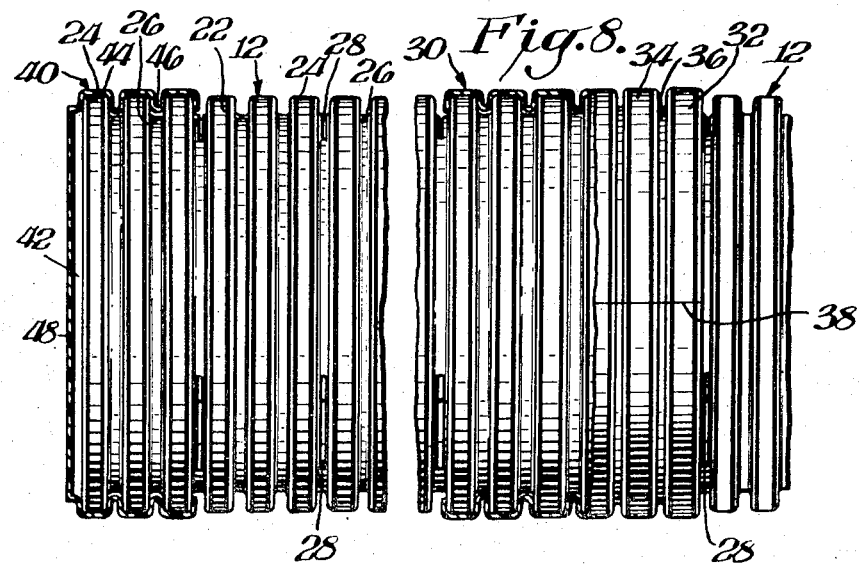
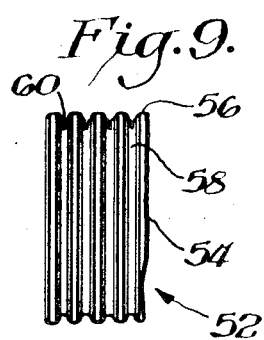
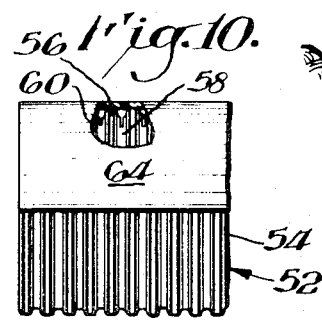
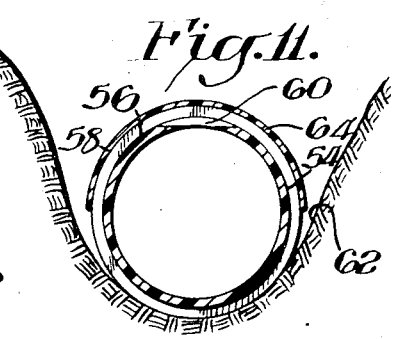

_3,699,684_

CORRUGATED DRAINAGE TUBES AND FITTINGS

REFERENCE TO RELATED APPLICATIONS

This is a continuation of application Ser. No. 819,339, filed Apr. 25, 1969, which in turn is a continuation of application Ser. No. 663,051, filed Aug. 24, 1967.

BACKGROUND OF THE INVENTION

The present invention relates to drainage tubes and fittings, and more particularly to flexible corrugated tubes and fittings for use in drainage systems.

Prior to the present invention, land improvement by providing proper drainage was an expensive and time-consuming operation. The red clay tile commonly used for this purpose required the piecing together of relatively short lengths to construct the desired drainage system. These systems were vulnerable to misalignment due to the large number of individual lengths that were required to construct them. Moreover, extreme care was required when the system of tiles was covered with earth in order to avoid breakage of the tile material. Often, makeshift arrangements were used to seal the ends of a branch line which frequently caused the system to clog due to the inflow of silt and dirt. Thus, the industry has long sought a drainage system which avoids the above noted disadvantages.

Accordingly, it is an object of the present invention to provide simple, economical, and easy-to-use drainage tubes and fittings for use in constructing drainage systems.

SUMMARY OF THE INVENTION

In accordance with the present invention, flexible corrugated drainage tubes comprising alternating annular peaks and valleys have a plurality of slotted openings arranged transversely to the longitudinal axis of the tubes. The openings provide communication between the interior and exterior of the tubes so that liquid such as water can drain into the tubes through the slotted openings. Preferably, the slotted openings are provided in at least every third annular valley of the tubes where three or more equally spaced apart slotted openings are located.

Another type of flexible corrugated drainage tube has a slotted opening in at least every third annular valley of the tube and the slotted openings are arranged side-by-side along a path parallel to the longitudinal axis of the tube. A sheet of flexible water-repellent material or a fine filtering material through which colloids will not flow may be disposed over the portion of the tube in which the slotted openings are located. The water-repellent or filtering material can be anchored to the annular peaks of the tube as by adhesive, if desired.

The fittings of the present invention are used in conjunction with the corrugated drainage tubing to construct a drainage system. A flexible coupling can be provided for connecting the ends of corrugated tubes together comprising a tubular body portion with alternating annular peaks and valleys. A longitudinal slit extends the length of the body to facilitate positioning of the coupling around the ends of the tubes to be connected. The peaks and valleys of the coupling are constructed and arranged to tightly fit over the corrugations in the tubes to be connected when the coupling is snapped over the ends of the tubes to connect them.

An end plug comprising a tubular body portion with alternating annular peaks and valleys is provided for capping the ends of flexible corrugated tubes. The plug has a closure at one end of the body portion as well as a longitudinal slit that extends the length of the body portion to facilitate capping of the tubes where desired. The peaks and valleys of the body portion of the end plug are constructed and arranged to snap tightly over the corrugated tube to be capped when the plug is snapped over the end of the tube.

BRIEF DESCRIPTION OF THE DRAWING

Novel features and advantages of the present invention in addition to those discussed above will become apparent from a reading of the following detailed description in conjunction with the accompanying drawing wherein similar reference characters refer to similar parts and in which:

FIG. 1 is a pictorial view of a drainage system according to the present invention;

FIG. 2 is a side elevational view of a flexible corrugated drainage tube according to the present invention;

FIG. 3 is a cross-sectional view taken along line 3—3 of FIG. 2;

FIG. 4 is a side elevational view of a flexible coupling according to the present invention;

FIG. 5 is an end elevational view of the flexible coupling illustrated in FIG. 4;

FIG. 6 is a side elevational view of an end plug for capping the ends of flexible corrugated tubes according to the present invention;

FIG. 7 is an end elevational view of the end plug illustrated in FIG. 6;

FIG. 8 is a side elevational view with portions broken away of a pair of corrugated tubes connected together by a flexible coupling and with an end plug capping the free end of one of the tubes;

FIG. 9 is a side elevational view of another flexible corrugated drainage tube according to the present invention;

FIG. 10 is a side elevational view of the corrugated tube of FIG. 9 with a sheet of flexible water-repellent material disposed over the portion of the tube in which the slotted openings are located; and FIG. 11 is a cross-sectional view of the tube of FIG. 10 in a trench.

DETAILED DESCRIPTION OF THE INVENTION

Referring in more particularity to the drawing, FIG. 1 represents a portion of a drainage system 10 wherein a plurality of flexible corrugated drainage tubes 12 are utilized in conjunction with flexible corrugated fittings to construct a network of subsurface drainage tubes. The system can comprise a series of main lines, one of which is shown at 14, as well as a plurality of lateral lines, such as 16, the laterals emptying into the mains as illustrated in the drawing. The drainage tubes are considerably longer than the red clay tile pieces used in the past, and the length of these tubes is only limited by the convenience in shipping and handling them. The drainage system 10 can be arranged below the surface of a field, for example, and can be installed by first digging slit trenches, such as illustrated in FIG. 1 at 18 and 20. The various tubes are simply positioned in the trenches and connected together, after which earth is filled in around them.

Alternative methods of installing the drainage system are also available and one of these involves the use of an apparatus for digging the trench and laying the tubing within the trench immediately after it is dug. The drainage tubing can be coiled on a drum such as its shipping container and simply fed down into the trench as the apparatus moves along the surface of the field in which the drainage system is being installed.

The various mains and laterals of the drainage system can be constructed by utilizing the flexible corrugated tubes 12 illustrated in FIGS. 2 and 3. These tubes are preferably fabricated of durable, high-strength polyethylene although other materials are suitable. Extruding techniques are used to shape the tubing by forcing the molten plastic through an annular orifice, as is well known. The formed plastic tube is then reshaped to form the corrugations.

The corrugated tube 12 comprises a body portion 22 having a series of alternating annular peaks 24 and valleys 26. The annular valleys are provided with drainage slots or openings 28 so that liquid from the field can pass into the tubes and drain away into a main, irrigation ditch, or waterway, for example. As shown in FIGS. 2 and 3, the slots or openings 28 are provided in every third annular valley of the corrugated drainage tube 12. Each valley has three equally spaced apart openings and the combined open area provided by the slots in the tubes is preferably between about ½ and 1 percent of the longitudinal surface area of the tube. The percentage of slotted open area to the longitudinal surface area of the tube functions exceptionally well to adequately drain a field in which the tubes are installed.

The slotted openings 28 provide the necessary fluid inlet area without sacrificing tube strength. Compared to perforations the slots are few in number, however, their width is such that heavy soils do not enter into the tube during the draining operation.

FIGS. 4 and 5 illustrate a flexible coupling 30 for connecting the ends of corrugated drainage tubes 12 together. The coupling comprises a tubular body portion 32 having alternating annular peaks 34 and valleys 36, with a longitudinal cut or slit 38 that extends the length of the body portion. As explained more fully, the longitudinal slit enables the coupling to be flexed slightly so as to enlarge its internal diameter and thereby enable it to be snapped over the ends of adjacent tubes to connect them together.

A fitting is also provided for capping the free ends of the corrugated tubes in the drainage system. This fitting comprises an end plug or cap 40 having a tubular portion 42 with alternating annular peaks 44 and valleys 46. A closure 48 is provided at one end of the body portion 42 and a longitudinal cut 50 in the body portion extends the length of that portion from the closure to the open end. The cut in the end plug 40 enables the tubular body portion to be flexed slightly so as to facilitate positioning of the plug on the free end of a corrugated drainage tube.

FIG. 8 illustrates a pair of abutting drainage tubes 12 connected together with the flexible coupling 30 shown in FIGS. 4 and 5. Additionally, an end plug or cap 40 is positioned on the left-hand end of the assembled tubes.

As can readily be understood, the annular peaks and valleys of both the end plug and the coupling are constructed and arranged so that each of these elements tightly fits the corrugated tube over which it is snapped. Accordingly, the width of the peak portions in the longitudinal direction of both the coupling and end plug are slightly wider than the peak portions of the tube in the same direction. Likewise, the valley portions of both the end plug and the coupling are slightly narrower than the valley portions of the corrugated drainage tube in the longitudinal direction. This enables the end plug as well as the flexible coupling to tightly engage the corrugated drainage tubes when these fittings are snapped in place on the tubes to construct the desired drainage system.

FIGS. 9—11 illustrate another embodiment of the present invention wherein a corrugated drainage tube 52 comprises a body portion 54 having a series of alternating annular peaks 56 and valleys 58. Unlike the corrugated tubes 12, at least every third annular valley in tube 50 has a single slotted opening 60. The openings are arranged side-by-side along a path parallel to the longitudinal axis of the tube. The total number of slotted openings and/or the length of each slot may be varied to maintain the ratio of inlet area to the longitudinal surface area of the tube the same as the corrugated tube 12, preferably between one-half and one percent.

Tube 50 can be positioned below the surface of a field to be drained in a trench such as 62 with a sheet of flexible water-repellent material 64 placed over the area of the tube in which the slotted openings are located. The water-repellent sheet can be held in place by securing it to the annular peak portions of the tube with adhesive. This performs the function of preventing movement of the sheet relative to the tube. Alternatively, a sheet of fine filtering material through which colloids will not flow may be used instead of the water-repellent material.

In operation, the tubing 52 is positioned below the surface of a field so that the slotted openings 60 are located at the top of the tube. By shielding these openings with water-repellent material 62 a plurality of arcuate channel 64 are formed, in part by the material and in part by the annular valleys 58. The liquid accumulates around the tubing and finally rises up into the arcuate channels and from the channels into the drainage tube through the slotted openings. This embodiment is particularly useful for draining light soils having a high colloid content. As the water rises to the top of the tube, the colloid particles settle out near the bottom of the tube and are therefore not introduced into the interior of the tubing with the liquid being drained. This prevents blockage of the drainage system which might otherwise occur if the sediment was allowed to enter the tubing.

What is claimed is:

1. A flexible corrugated drainage tube having alternating flat annular peaks and flat annular valleys with walls interconnecting the flat peaks and valleys, each interconnecting wall lying in a plane substantially perpendicular to the longitudinal axis of the tube with the distance between the exterior of adjacent walls across each annular valley substantially less than the distance between the exterior of adjacent walls across each annular peak, and a plurality of slotted openings in the flat valleys of the tube spaced from and between the interconnecting walls of the tube for providing communication between the interior and exterior of the tube so that liquid can drain into the tube through the slotted openings.

2. A flexible corrugated drainage tube as in claim 1 wherein the slotted openings are provided in at least every third annular valley of the tube.

3. A flexible corrugated drainage tube as in claim 2 wherein every third annular valley has three equally spaced apart slotted openings.

4. A flexible corrugated drainage tube as in claim 3 wherein each slotted opening is narrow and the area defined by the slotted openings is between about ½ and 1 percent of the longitudinal surface area of the tube.

5. A flexible corrugated drainage tube as in claim 1 wherein a slotted opening is provided in at least every third annular valley of the tube, and the slotted openings are arranged side-by-side along a path parallel to the longitudinal axis of the tube.

6. A flexible corrugated drainage tube as in claim 1 in combination with a flexible coupling for connecting the ends of corrugated tubes together, the coupling comprising a tubular body portion having alternating annular peaks and valleys, and a longitudinal slit extending the length of the tubular body portion, the peaks and valleys of the coupling being constructed and arranged to tightly fit over the corrugations in the tubes to be connected when the coupling is snapped over the ends of the tubes to connect them.

7. A flexible corrugated drainage tube as in claim 1 in combination with a plug for capping the end of the tube, the plug comprising a tubular body portion having alternating annular peaks and valleys, a closure at one end of the body portion, and a single longitudinal slit in the body portion that extends the length of the body portion of the closure, the peaks and valleys of the body portion of the end plug being constructed and arranged to fit tightly over the corrugated tube when the plug is snapped over the end of the tube to cap it.

8. A flexible corrugated drainage tube as in claim 1 in combination with at least one additional drainage tube of similar configuration, a flexible coupling connecting the end of one tube to the end of the other tube, the flexible coupling having alternating flat annular peaks and flat annular valleys arranged to fit over the flat peaks and valleys of the tubes to be connected, and a plug for capping the unconnected end of one of the tubes.

9. A flexible corrugated drainage tube of substantially uniform thickness throughout having alternating flat annular peaks and flat annular valleys with walls interconnecting the flat peaks and valleys, and a plurality of slotted openings in the flat valleys of the tube spaced from and between the walls of the tube arranged transversely to the longitudinal axis of the tube for providing communication between the interior and exterior of the tube so that liquid can drain into the tube through the slotted openings, the plurality of slotted openings including an opening in at least every third annular valley of the tube with each and every opening arranged side-by-side along a single path parallel to the longitudinal axis of the tube, and a sheet of flexible water-permeable material disposed over the portion of the tube in which the slotted openings are located.

10. A flexible corrugated drainage tube as in claim 9 wherein the flexible water-permeable material covers approximately one-half of the tube.

11. A flexible corrugated drainage tube of substantially uniform thickness throughout having alternating flat annular peaks and flat annular valleys with walls interconnecting the flat peaks and valleys, each interconnecting wall lying in a plane substantially perpendicular to the longitudinal axis of the tube, and a plurality of slotted openings in the flat valleys of the tube spaced from and between the interconnecting walls of the tube for providing communication between the interior and exterior of the tube so that liquid can drain into the tube through the slotted openings, and a sheet of water-permeable material fixedly secured to the flat annular peaks of the tube in the area where the slotted openings are located.

12. A flexible corrugated drainage tube as in claim 11 wherein each and every slotted opening is arranged side-by-side along a single path parallel to the longitudinal axis of the tube.

13. A flexible corrugated drainage tube as in claim 11 wherein the flexible water-permeable material covers approximately one-half of the tube.

* * * * *

PO-1050
(5/69)

UNITED STATES PATENT OFFICE
CERTIFICATE OF CORRECTION

Patent No. 3,699,684   Dated October 24, 1972

Inventor(s) Marty E. Sixt

It is certified that error appears in the above-identified patent and that said Letters Patent are hereby corrected as shown below:

Column 2, line 16, "areading" should be -- a reading --

Column 3, line 33, "The" should be -- This --

Column 4, line 44, "channel" should be -- channels --

Column 5, line 38, "of" (first occurrence) should be

-- to --

Signed and sealed this 20th day of February 1973.

(SEAL)
Attest:

EDWARD M. FLETCHER, JR.
Attesting Officer

ROBERT GOTTSCHALK
Commissioner of Patents